United States Patent Office.

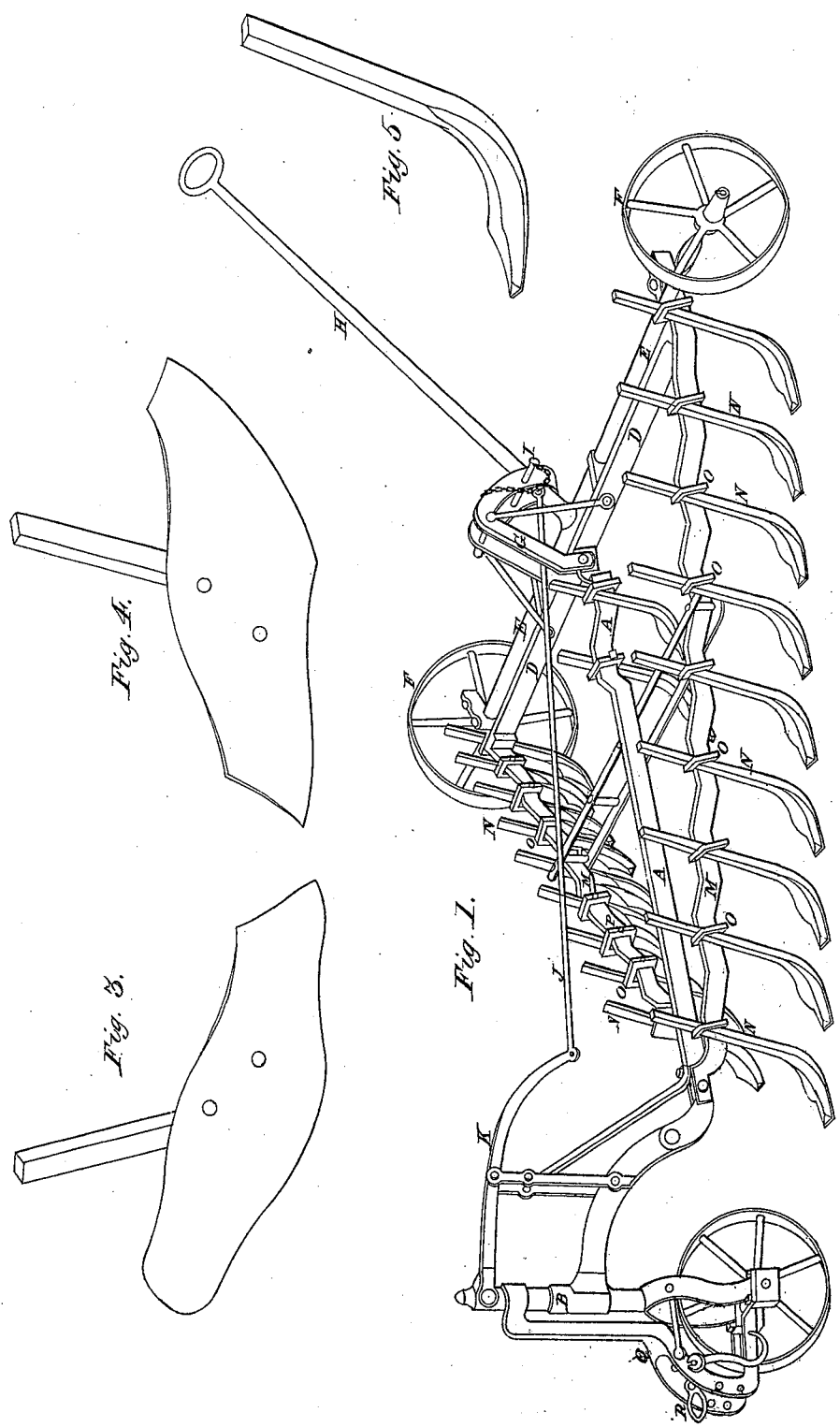

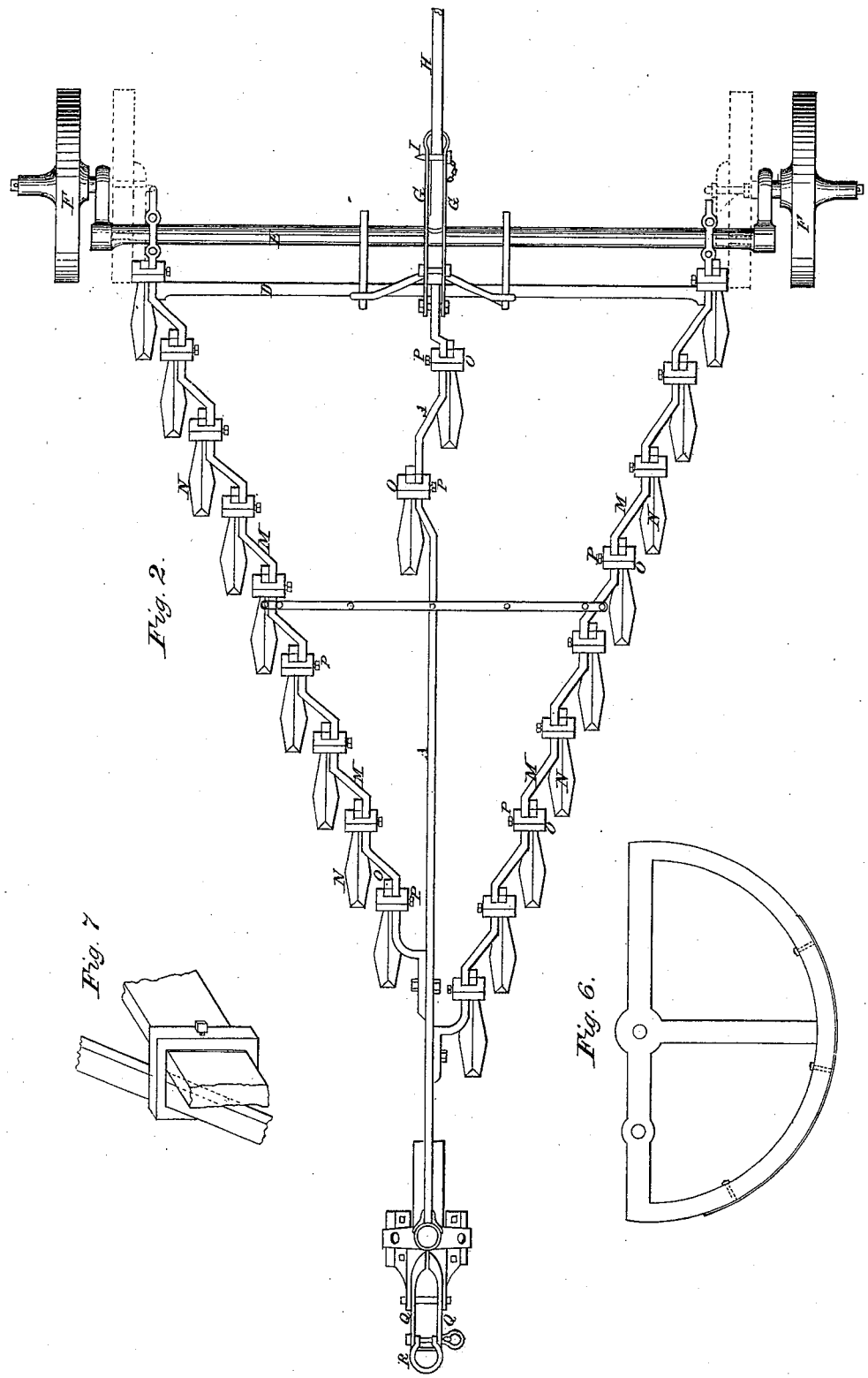

DAVID EDWARDS, OF MARONG, NEAR SANDHURST, AUSTRALIA.

Letters Patent No. 113,148, dated March 28, 1871.

IMPROVEMENT IN CULTIVATORS.

The Schedule referred to in these Letters Patent and making part of the same.

*To all whom it may concern:*

Be it known that I, DAVID EDWARDS, of Marong, near Sandhurst, in the British colony of Victoria in Australia, blacksmith, have invented certain "Improvements in the Construction of Land-Cultivators;" and I do hereby declare that the following is a full and exact description thereof, reference being had to the accompanying drawing and to the letters of reference marked thereon.

My invention consists of certain improvements in the construction of land-cultivators, whereby I am enabled to produce a machine which will perform the work required to be done by it in a much more effective manner than can be accomplished by any other machine of the same class, and that too at a less expense in construction and with greater economy in working. It is so designed that it may be used either for plowing or scarifying, as may be desired.

Referring to the drawing hereto attached—

Figure 1 represents a perspective view of my machine fitted with teeth as a scarifier; and Figure 2 shows plan of same; while Figures 3, 4, 5, 6, and 7 show detailed views of some of the parts on a larger scale, including the plowshares, which may be substituted for the scarifying teeth when required, as hereinafter explained, A is the center-bar or beam, one extremity of which is connected by a clutch or clasp, B, fitting loosely on the vertical shaft C, while the other extremity is connected to a cross-bar, D, which is attached to the crank-axle E of the back-bearing wheels F.

From this end of the center-beam there rise two parallel pieces of iron, G, which form the guide for the handle of the lever H, the position of which may be adjusted by means of pin I passing through the perforations made in the guide G.

This lever is connected to the crank-axle E.

To this lever I attach a rod, J, which is connected at its other extremity to another lever, K, acting upon fulcrum L, and proceeding to the top of shaft C, as shown.

M are iron bars, bent in the shape shown, to which I attach the teeth N by means of square clasp O and set-screw P.

Q are two pieces of iron, having perforations, as shown, for the reception of the straight portion of the draft-link R.

S is a key, for screwing or unscrewing the set-screws.

The drawing represents a four-horse machine, in which there are twenty teeth, each placed in a line about three inches outside the other, (with the exception of the two attached to the center-beam,) and each being at a point about ten inches behind each other.

Now, if a two-horse (or twelve-toothed) machine be made, the teeth will require to be a longer distance (say twelve inches) behind each other, although only the same distance outside each other.

In order to accomplish this the angles in the zigzag bar must be made longer and more obtuse than in the larger machine, so that the center-beam will be about six feet in length, the larger one being about eight feet.

It will be seen at once that the length of the teeth below the zigzag bar or center-beam, (as the case may be,) as well as the degree of angularity to be given to them, can be regulated to a nicety by means of the set-screws P and clasps O, while by the same means they may be removed altogether and the plowshares substituted for them.

When the plowshares are so substituted for the scarifying teeth I only remove every other tooth, so that there would be five plowshares only on one side and four on the other, which are to be so set that they will form the ridge inside the zigzag bar, each turning over the earth toward the opposite side of the machine. In order to accomplish this it will be necessary to have those on the right-hand side of the machine with a left-hand pitch, and those on the left-hand side of the machine with a right-hand pitch.

If my machine be used for working ground close to any growing plant, such as vines, it will be advisable to substitute sledges, as shown in fig. 6, for the back-bearing wheels, attaching them to the short crank at each end of the axle, and making the axle somewhat shorter, as shown in dotted lines, fig. 2.

By my method of construction the whole body of the machine may be lifted perpendicularly (and consequently without altering the position in which the teeth or plowshares may be set relatively to their work) by means of lever H, and may be kept in any required position by means of pin I; and the breakage, which often occurs in the teeth by reason of that part of them which is held being reduced in size, and in the bars by reason of the perforations usually made therein, is prevented.

Having thus described the nature of my invention and the manner of performing the same, I would have it understood that I do not confine myself to the precise details of any of the parts of my machines so long as the nature thereof be retained; but

I claim—

1. The teeth N, or plowshares, figs. 3 and 4, constructed substantially as herein shown and described.

2. The zigzag bars M, teeth N, clasps O, center-bar A, cross-bar D, in combination with the crank-axle E, the whole arranged and operating substantially as described.

The above specification of my invention signed by me this 8th day of October, 1869.

DAVID EDWARDS.

Witnesses:
 EDWARD WATERS,
 JOHN ARTHUR.